US009063736B2

(12) United States Patent
Sawada

(10) Patent No.: US 9,063,736 B2
(45) Date of Patent: Jun. 23, 2015

(54) METHOD AND APPARATUS FOR REDUCING A LINK RATE OF COMMUNICATION DEVICE IN A PRE-STANDBY STATE UPON DETECTING NO TRAFFIC FOR A PREDETERMINED TIME PERIOD

(75) Inventor: Keito Sawada, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 276 days.

(21) Appl. No.: 13/476,423

(22) Filed: May 21, 2012

(65) Prior Publication Data

US 2012/0311362 A1    Dec. 6, 2012

(30) Foreign Application Priority Data

Jun. 1, 2011    (JP) ................................ 2011-123573

(51) Int. Cl.
*G06F 1/00* (2006.01)
*G06F 1/32* (2006.01)
*H04L 1/00* (2006.01)

(52) U.S. Cl.
CPC ............. *G06F 1/3278* (2013.01); *H04L 1/0002* (2013.01); *H04L 1/0025* (2013.01); *G06F 1/3209* (2013.01); *G06F 1/3203* (2013.01); *Y02B 60/126* (2013.01); *Y02B 60/32* (2013.01)

(58) Field of Classification Search
CPC ... H04L 1/0002; H04L 1/0025; G06F 1/3203; G06F 1/3209; G06F 1/3287; G06F 1/32; H04W 28/18; H04W 28/20
USPC ........................................................ 713/323
See application file for complete search history.

(56) References Cited

U.S. PATENT DOCUMENTS

| | | | | |
|---|---|---|---|---|
| 5,708,656 | A * | 1/1998 | Noneman et al. ............. | 370/335 |
| 8,286,007 | B2 * | 10/2012 | Diab et al. ..................... | 713/323 |
| 2002/0157030 | A1 * | 10/2002 | Barker et al. .................. | 713/320 |
| 2002/0196736 | A1 * | 12/2002 | Jin ................................ | 370/229 |
| 2003/0088797 | A1 * | 5/2003 | Gaur ............................. | 713/300 |
| 2004/0088590 | A1 * | 5/2004 | Lee et al. ...................... | 713/300 |
| 2005/0105545 | A1 * | 5/2005 | Thousand et al. ............ | 370/442 |
| 2007/0240004 | A1 * | 10/2007 | Maeda .......................... | 713/322 |
| 2009/0327506 | A1 * | 12/2009 | Diab ............................. | 709/230 |
| 2010/0115295 | A1 * | 5/2010 | Diab ............................. | 713/300 |
| 2010/0118753 | A1 | 5/2010 | Mandin et al. | |

FOREIGN PATENT DOCUMENTS

| | | |
|---|---|---|
| JP | 2002-78196 | 3/2002 |
| JP | 2004-064335 A | 2/2004 |
| JP | 2005-303978 | 10/2005 |

(Continued)

*Primary Examiner* — Jaweed A Abbaszadeh
*Assistant Examiner* — Xuxing Chen
(74) *Attorney, Agent, or Firm* — Oblon, McClelland, Maier & Neustadt, L.L.P.

(57) ABSTRACT

A communication device that has a normal state and a standby state and that does not permit change of a link rate in the standby state includes: a connecting unit that connects the communication device to a network; a detecting unit that detects traffic at the connecting unit in the network; and a control unit that performs transition processing from the normal state to the standby state when the detecting unit does not detect the traffic for a first period while the communication device is in the normal state. When the control unit is connected to the network by the connecting unit at a first link rate and the detecting unit does not detect the traffic for a second period that is shorter than the first period, the control unit changes the link rate to a second link rate that is lower than the first link rate.

8 Claims, 15 Drawing Sheets

(56) References Cited

FOREIGN PATENT DOCUMENTS

| JP | 2006-332807 | 12/2006 |
| JP | 2007-276341 | 10/2007 |
| JP | 2010-193126 | 9/2010 |
| JP | 2010-213259 | 9/2010 |
| JP | 2010-268024 | 11/2010 |
| JP | 2011-061428 A | 3/2011 |

* cited by examiner

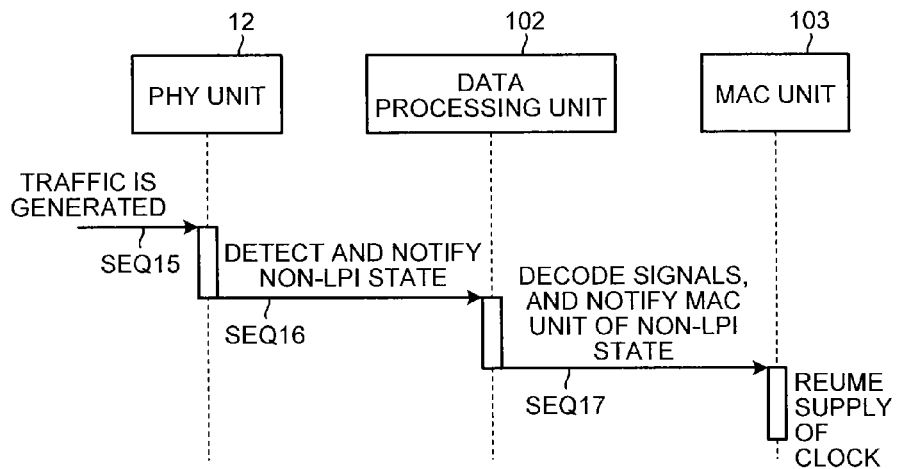
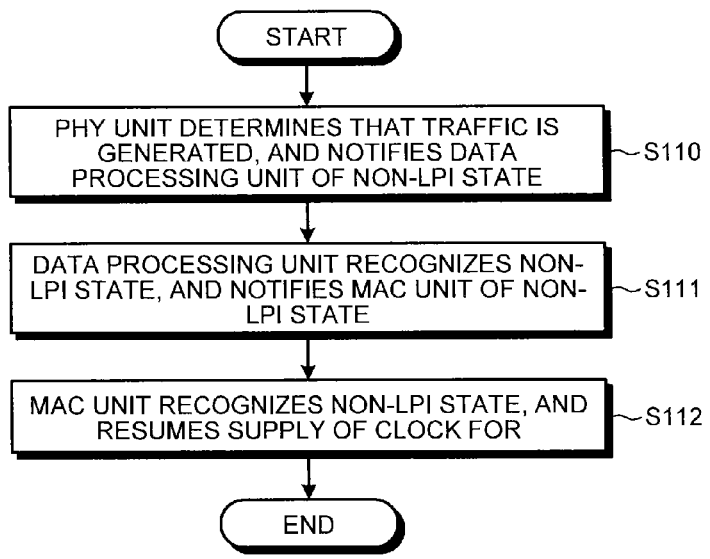

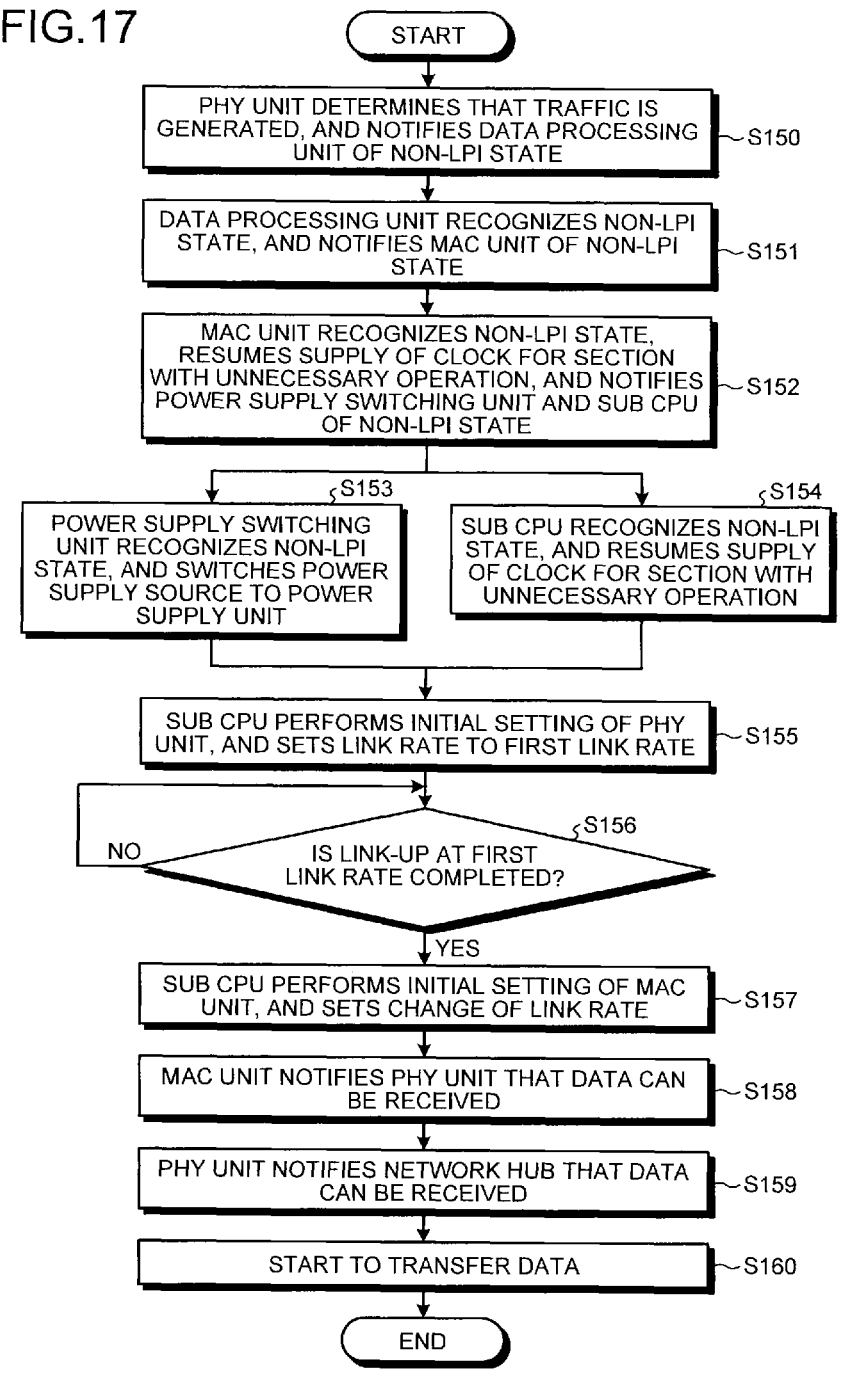

METHOD AND APPARATUS FOR REDUCING A LINK RATE OF COMMUNICATION DEVICE IN A PRE-STANDBY STATE UPON DETECTING NO TRAFFIC FOR A PREDETERMINED TIME PERIOD

CROSS-REFERENCE TO RELATED APPLICATIONS

The present application claims priority to and incorporates by reference the entire contents of Japanese Patent Application No. 2011-123573 filed in Japan on Jun. 1, 2011.

BACKGROUND OF THE INVENTION

1. Field of the Invention

The present invention relates to a communication device and a communication method having a function to suppress power consumption in a standby state.

2. Description of the Related Art

Conventionally, office automation (OA) equipment, such as printers and multifunction peripherals (MFPs) that enable a plurality of functions including a printing function, a scanning function, a copying function, and a facsimile (FAX) function in one housing has been designed to reduce power consumption by, when a device is not used for more than a predetermined time period, making only a part of the functions in the device enabled and stopping supplying power to a section whose function is made disabled. Hereinafter, a state in which power consumption is reduced in this manner when a device is not used for more than a predetermined time period is referred to as a standby state.

Examples of a method for supplying power in the standby state include a method using an energy device that generates electricity, such as a solar cell, in addition to a method for supplying power from a commercial power supply, which has been conventionally employed. By supplying power using the energy device in the standby state, power consumption can be reduced more effectively. In the standby state, it is preferable to reduce power consumption as much as possible even in the case where power is supplied from the energy device besides the case where power is supplied from the commercial power supply.

A function made enabled in the standby state and power consumption in the standby state are in a trade-off relationship. For example, an MFP and a printer described above typically have a communication function through a network. In such a device, if the communication function through the network is made disabled in the standby state, the device virtually disappears from the network.

While the device disappears from the network, even if a packet is transferred to the device via the network, the packet is not received by the device unless the device returns to a normal state automatically. In this case, a user needs to cause the device to return to the normal state manually, for example. Therefore, it is significantly effective to make the network communication function enabled in the standby state, and to make the device capable of responding to the network.

In recent years, data transfer technologies over networks have been developed, and network standards that support a higher transfer rate have become popular. In Ethernet (registered trademark), for example, compared with conventional 100BASE-x standard at a transfer rate of 100 Mbps, 1000BASE-x standard at a transfer rate of 1 Gbps and 10GBASE-x standard at a transfer rate of 10 Gbps have become popular. Note that "-x" in "100BASE-x" and the like indicates an aspect of a communication path, and stands for "T", "TX", or "FX", for example.

As described above, associated with an increase in a data transfer rate over a network, power consumption in a communication interface corresponding thereto tends to increase. In responding to the increase in power consumption, it is required to reduce power consumption in a communication interface by monitoring traffic on the network and controlling a function of the communication interface according to the traffic.

Institute of Electrical and Electronics Engineers (IEEE) has established IEEE 802.3az as one of communication standards capable of controlling a function of a communication interface according to the traffic. The IEEE 802.3az is also referred to as Energy Efficient Ethernet (EEE, which is a registered trademark). The IEEE 802.3az specifies that traffic of a network is monitored, and if no traffic is generated for a certain period of time, power-saving control is applied to a physical layer (PHY layer), which is the lowest layer, and to a data link layer (media access control (MAC) layer), which is a layer upper than the PHY layer.

According to the IEEE 802.3az, for example, by taking account of the traffic of the network, if no communication is performed for a certain period of time, reduction in power consumption is attempted by stopping a clock for a chip in the MAC layer to make the function of the MAC layer disabled. Furthermore, even if no communication is performed for the certain period of time, a packet can be received in the standby state by enabling the function of the PHY layer. There is a method called low power idle (LPI) for controlling, depending on presence or absence of communications, the MAC layer by switching the function thereof between enabled and disabled. Hereinafter, a state in which no communication is performed for a certain period of time that is a threshold for making the function of the MAC layer disabled is referred to as an LPI state.

In relation to the IEEE 802.3az, Japanese Patent Application Laid-open No. 2010-268024 discloses a technology for enabling to identify silent failure, which can occur on an Ethernet (registered trademark) network to which the IEEE 802.3az is applied and which may not be recognized by an operation manager, from a remote network operation management system reliably and promptly.

Japanese Patent Application Laid-open No. 2010-213259 discloses a technology for enabling to reduce power consumption by putting a user device into a sleep mode through Ethernet (registered trademark) to which the IEEE 802.3az is applied to allow a transmitter and a receiver of the user device to power off for a predetermined time period (sleep time).

Before the establishment of the IEEE 802.3az, however, even a system considering a network response in the standby state has had no measure to suppress power consumption if no traffic is generated on a network. In other words, conventionally, in a system capable of responding to a network in the standby state, control has been performed such that the system is caused to return from the standby state to the normal state at a required timing by filtering packets transmitted via the network. However, no control for reducing power consumption according to a monitoring result of traffic has been performed before the establishment of the IEEE 802.3az.

Furthermore, power consumption in a communication interface increases as the link rate increases even if the IEEE 802.3az is applied thereto. If the link rate is in the 1000BASE class (1 Gbps), for example, the power consumption increases by approximately 50 mW to 100 mW compared with the case where the link rate is in the 100BASE class (100 Mbps). For this reason, if a communication interface is used at a link rate of the 1000BASE class, it may be difficult to use an energy device, such as a solar cell, for supplying power in the standby state.

To address this problem, the link rate may be degraded from the 1000BASE-x class to the 100BASE-x class in the standby state. In accordance with the IEEE 802.3az standard, however, there has been a problem in that the link rate fails to be changed after the device shifts to the LPI state. This problem is common to Japanese Patent Application Laid-open No. 2010-268024 and Japanese Patent Application Laid-open No. 2010-213259.

As described above, in a communication interface usable at a higher link rate, such as 1000BASE-x, it is required to make a network response enabled and to achieve further reduction in power consumption in the standby state.

In view of the problems described above, there is a need to make a network response enabled and to achieve further reduction in power consumption of a communication interface in a standby state.

SUMMARY OF THE INVENTION

It is an object of the present invention to at least partially solve the problems in the conventional technology.

A communication device that has a normal state and a standby state such that power consumption is more suppressed in the standby state than in the normal state, and that does not permit change of a link rate in the standby state, includes: a connecting unit that connects the communication device to a network; a detecting unit that detects traffic at the connecting unit in the network; and a control unit that performs transition processing from the normal state to the standby state when the detecting unit does not detect the traffic for a first period that has been predetermined while the communication device is in the normal state. When the control unit is connected to the network by the connecting unit at a first link rate and the detecting unit does not detect the traffic for a second period that is shorter than the first period, the control unit changes the link rate to a second link rate that is lower than the first link rate.

A communication method, in which a normal state and a standby state are provided such that power consumption is more suppressed in the standby state than in the normal state and a change of a link rate in the standby state is not permitted, includes: connecting, by a connecting unit, to a network; detecting, by a detecting unit, traffic in the connecting unit on the network; and controlling, by a control unit, to perform transition processing from the normal state to the standby state when the traffic is not detected at the detecting for a first period that has been predetermined in the normal state. When the controlling is connected to the network at a first link rate by the connecting and the traffic is not detected by the detecting for a second period which is shorter than the first period, the link rate is changed by the controlling to a second link rate that is lower than the first link rate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an exemplary sequence diagram of processing which is performed when the non-LPI state is detected and is conforming to the IEEE 802.3az;

FIG. 6 is an exemplary flowchart of the processing which is performed when the non-LPI state is detected and is conforming to the IEEE 802.3az;

FIG. 17 is an exemplary flowchart of the processing performed when the non-LPI state is detected at a high link rate according to the embodiment.

DETAILED DESCRIPTION OF THE PREFERRED EMBODIMENTS

An exemplary embodiment of a communication device is described below in detail with reference to the accompanying drawings. To facilitate understanding, communication control conforming to the IEEE 802.3az of Institute of Electrical and Electronics Engineers (IEEE) will be schematically described. The IEEE 802.3az is also referred to as Energy Efficient Ethernet (EEE, which is a registered trademark), and is intended to suppress an increase in power consumption associated with an increase in a transfer rate on a network.

Examples of methods for achieving power saving in the IEEE 802.3az include low power idle (LPI). In the LPI, traffic is monitored, and if no traffic for the device is generated for a certain period of time, it is determined that no communication is performed, whereby the device is shifted to a standby state. In the standby state, power consumption is reduced by making a function of a media access control (MAC) layer disabled. In addition, it is possible to achieve a network response even in the standby state by making a function of a physical layer (PHY layer) enabled. Hereinafter, a state in which no traffic addressed to a target device is generated for a predetermined period of time is referred to as an LPI state of the target device.

Figure 1:
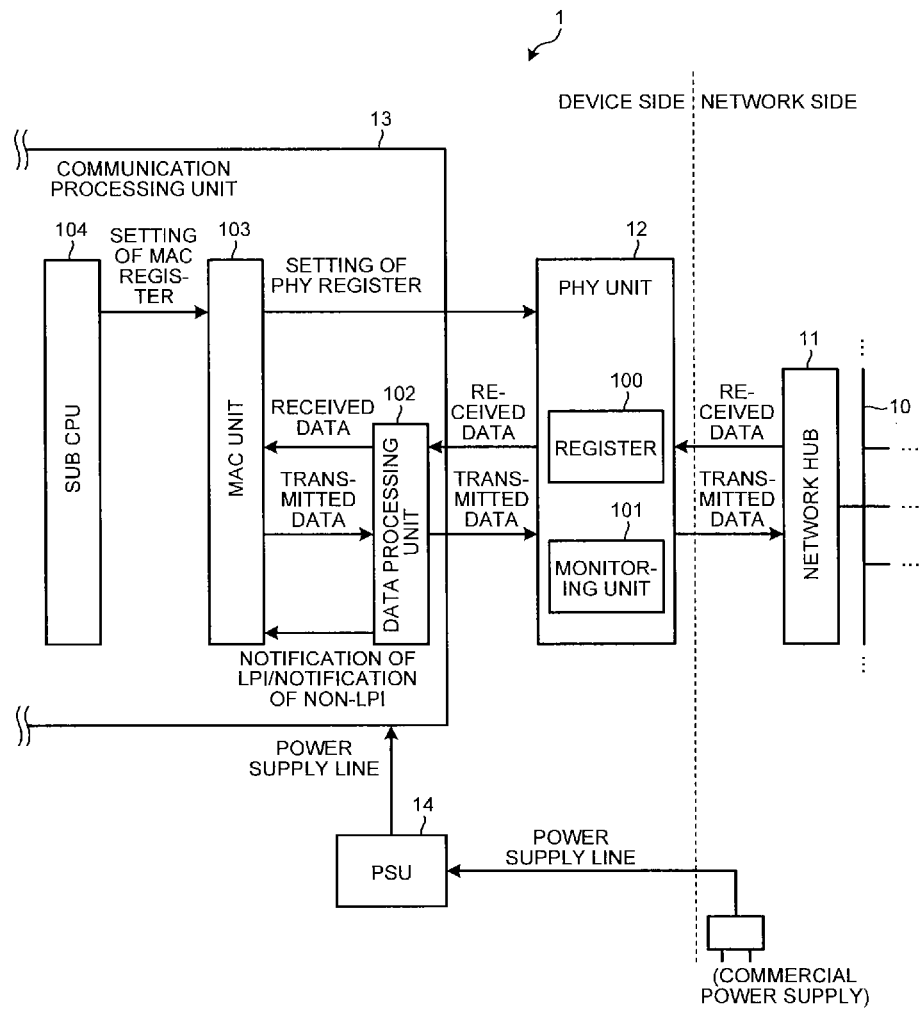
FIG. 1 is a block diagram of an exemplary configuration of a communication interface that is applicable to the IEEE 802.3az.

FIG. 1 illustrates an exemplary configuration of a communication interface 1 that is applicable to the IEEE 802.3az. In the example illustrated in FIG. 1, the communication interface 1 includes a PHY unit 12 and a communication processing unit 13. The communication interface 1 is used by being incorporated in an information device, such as a personal computer, a printer, and a multifunction peripheral (MFP). A network 10, such as Ethernet (registered trademark), and the PHY unit 12 of the communication interface 1 are connected via a network hub 11. The network hub 11 performs routing of network information transferred via the network 10.

In Ethernet (registered trademark), data is included in a packet of a predetermined length, and is transferred on the network 10 with a header added to the beginning of the packet by including synchronization information and address information.

In the communication interface 1, the PHY unit 12 performs processing related to a physical layer in network communications, and controls electrical connection in communications performed via the network 10. The PHY unit 12 determines a link rate, a transmission code, and a signal waveform in the network communications, for example. More specifically, data on the network side, that is, in the network 10 and the network hub 11 depends on a connection cable, and is transferred as an optical signal or an electrical signal. By contrast, on the device side including the communication interface 1, data is treated as a logic signal. Therefore, the PHY unit 12 performs conversion processing between the optical signal or the electrical signal, and the logic signal, thereby functioning as a connecting unit.

The PHY unit 12 includes a register 100 and a monitoring unit 101. The register 100 stores therein a set value for the PHY unit 12. Operations of the PHY unit 12 are controlled by a value written to the register 100. For example, a set value for a link rate in the network communications is stored in the register 100. The PHY unit 12 reads the set value stored in the register 100, thereby setting the link rate.

The monitoring unit 101 detects traffic in the communication interface 1, and monitors the traffic. The monitoring unit 101, for example, monitors a received data signal transferred from the network 10 to the PHY unit 12 via the network hub 11, thereby detecting traffic thereof. In addition, the monitoring unit 101 monitors a transmitted data signal that is output from a media access control (MAC) unit 103, which will be described later, and is transmitted by the PHY unit 12 to the network 10 via the network hub 11, thereby detecting traffic thereof.

To establish a link, or to maintain the link thus established, the PHY unit 12 transmits and receives a signal, such as an idle signal and a link pulse, to and from the network hub 11. The signals used for establishing and maintaining the link are treated distinctively from actual data detected as the traffic. Therefore, even if the PHY unit 12 determines that no traffic is generated, these signals may be generated.

Based on the monitoring result of the traffic, the monitoring unit 101 detects an LPI state and a non-LPI state. If the LPI state is detected, processing for reducing power consumption is performed on the communication interface 1 side. Furthermore, if the LPI state is detected, the monitoring unit 101 uses a received data signal, a data valid signal, and a data error signal to notify the MAC unit 103, to be described later, of the LPI state.

By combining the received data signal, the data valid signal, and the data error signal in this manner, it is possible to express the LPI state and the non-LPI state. The combinations of values of the received data signal, the data valid signal, and the data error signal to express the LPI state and the non-LPI state are defined in IEEE 802.3az.

Furthermore, if the LPI state is detected, the monitoring unit 101 performs processing for suppressing an operation of a function unnecessary in the standby state among functions of the PHY unit 12. The monitoring unit 101, for example, stops to supply a clock to a circuit section of a function unnecessary in the standby state. As a result, power consumption in the PHY unit 12 is reduced.

By contrast, if traffic is generated in the LPI state, and the non-LPI state is detected, the monitoring unit 101 performs processing opposite to that in the LPI state. That is, the monitoring unit 101 resumes the function stopped in the PHY unit 12 to be in the LPI state. In addition, the monitoring unit 101 uses the predetermined combination of the received data signal, the data valid signal, and the data error signal to notify the communication processing unit 13 of the non-LPI state.

In the communication interface 1, the communication processing unit 13 includes a data processing unit 102, the MAC unit 103, and a sub central processing unit (CPU) 104. The communication processing unit 13 can be configured as an application specific integrated circuit (ASIC) that includes the data processing unit 102, the MAC unit 103, and the sub CPU 104, for example. Incidentally, the sub CPU 104 may be realized by using a function of a CPU externally provided to the communication processing unit 13.

In the communication processing unit 13, the data processing unit 102 decodes the received data signal, the data valid signal, and the data error signal received from the monitoring unit 101, and determines whether the combination of these signals notifies one of the LPI state and the non-LPI state. If the combination is determined to notify one of the LPI state and the non-LPI state, the data processing unit 102 further determines whether the combination of the signals indicates the LPI state or the non-LPI state, and notifies the MAC unit 103 of the determination result.

The MAC unit 103 performs access control in Ethernet (registered trademark) based on an instruction from the sub CPU 104 and a content of communications with the data processing unit 102. The MAC unit 103 sets a value to the register 100 of the PHY unit 12, and instructs the PHY unit 12 to perform setting of a link rate and initial setting (reset), for example. The sub CPU 104 issues the instruction to the MAC unit 103 by writing a value to a register (not illustrated) in the MAC unit 103, for example.

Furthermore, based on the notification of one of the LPI state and the non-LPI state from the data processing unit 102, the MAC unit 103 performs ON-OFF control on a clock of a section, an operation of which is unnecessary in the standby state, in the communication processing unit 13. Thus, the MAC unit 103 suppresses the operation of the communication processing unit 13, thereby reducing power consumption. More specifically, when the MAC unit 103 receives the notification of the LPI state from the data processing unit 102, the MAC unit 103 stops a clock of a section predetermined to be unnecessary in the standby state in the MAC unit 103. By contrast, if the MAC unit 103 receives the notification of the non-LPI state from the data processing unit 102, the MAC unit 103 resumes the clock of the section that has been stopped in the LPI state.

A power supply unit (PSU) 14 generates, from a commercial power supply, power to be supplied to the entire information device including the communication processing unit 13 and the PHY unit 12. The power generated by the PSU 14 is supplied to the communication processing unit 13 and the PHY unit 12 via a power supply line, for example.

Figure 2:
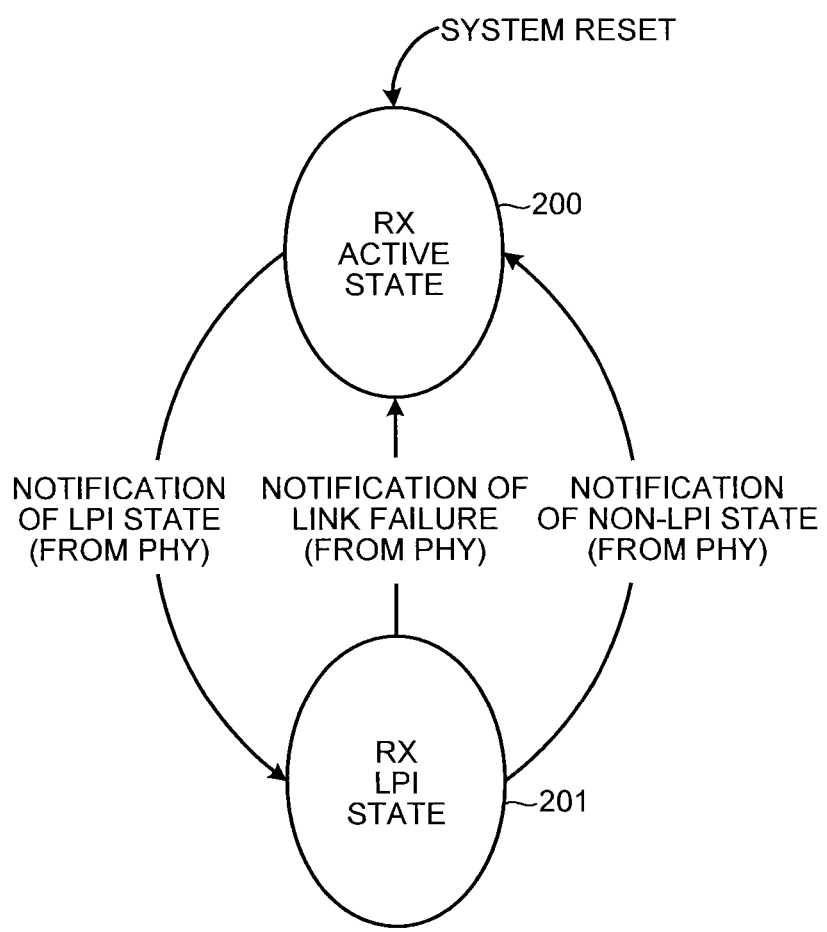
FIG. 2 is a state transition diagram of an exemplary state transition which is associated with notification of an LPI state or a non-LPI state in a MAC unit and is conforming to the IEEE 802.3az.

FIG. 2 is a state transition diagram of an exemplary state transition associated with notification of the LPI state or the non-LPI state in the MAC unit 103 conforming to IEEE 802.3az. The MAC unit 103 has two states consisting of a first state (RX active state) 200 and a second state (RX LPI state) 201. The first state 200 is a normal state in which a specific clock is supplied to each section of the MAC unit 103, and all the functions of the MAC unit 103 are made enabled.

By contrast, the second state 201 is the standby state in the LPI state in which the functions of the MAC unit 103 are suppressed to achieve reduction in power consumption. The functions of the MAC unit 103 are suppressed by stopping a specific clock for a section predetermined to be unnecessary in the standby state in the MAC unit 103. Furthermore, in the second state 201, the link rate is prohibited from being changed.

When receiving the notification of the LPI state from the PHY unit 12 in the first state 200, the MAC unit 103 causes a transition of the state to the second state 201, and stops a clock for a section unnecessary in the standby state in the MAC unit 103. In addition, when receiving the notification of the non-LPI state from the PHY unit 12 in the second state 201, the MAC unit 103 causes a transition of the state to the first state 200, and resumes the supply of the clock stopped in the second state 201. Furthermore, when receiving notification of link failure from the PHY unit 12 in the second state 201, the MAC unit 103 causes a transition of the state to the first state 200, and resumes the supply of the clock stopped in the second state 201.

Figure 3:
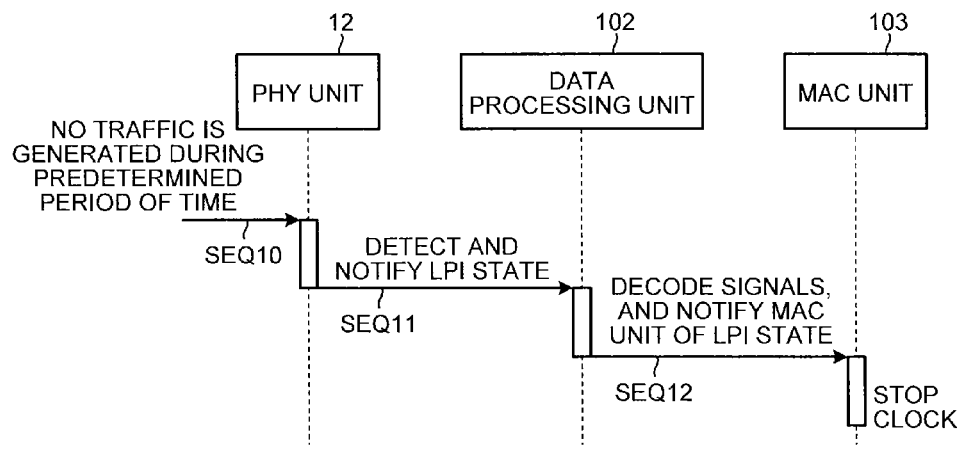
FIG. 3 is an exemplary sequence diagram of processing which is performed when the LPI state is detected in the non-LPI state and is conforming to the IEEE 802.3az.
Figure 4:
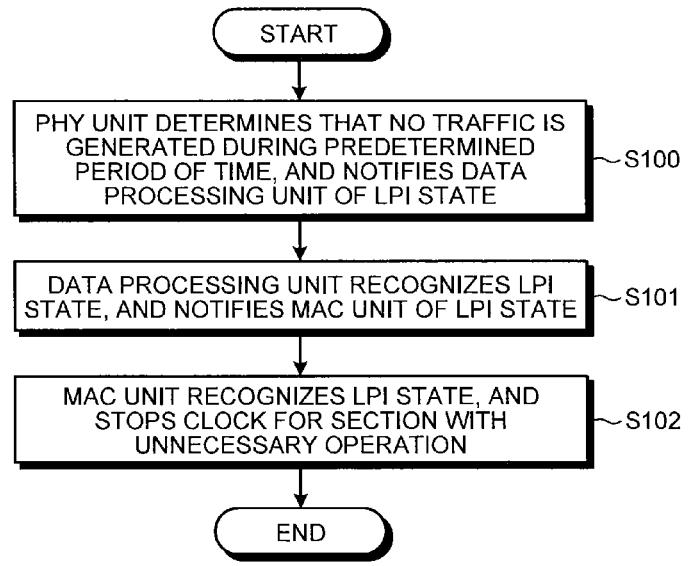
FIG. 4 is an exemplary flowchart of the processing which is performed when the LPI state is detected and is conforming to the IEEE 802.3az.

With reference to a sequence diagram of FIG. 3 and a flowchart of FIG. 4, processing performed when the LPI state is detected in the non-LPI state conforming to the IEEE 802.3az will now be described in greater detail. The PHY unit 12 monitors traffic from the network 10 to the communication interface 1. At Step S100 in FIG. 4, if the PHY unit 12 determines that no traffic is generated for a predetermined period of time (SEQ10 in FIG. 3), the PHY unit 12 detects the LPI state. The PHY unit 12 combines values of the received data signal, the data valid signal, and the data error signal into a combination indicating the LPI state, and transmits the signals to the data processing unit 102, thereby notifying the data processing unit 102 of the LPI state (SEQ11).

Subsequently, at Step S101, the data processing unit 102 decodes the received data signal, the data valid signal, and the data error signal received from the PHY unit 12, and recognizes that the device is in the LPI state. At Step S102, when the data processing unit 102 recognizes the LPI state, the data processing unit 102 notifies the MAC unit 103 thereof (SEQ12). Based on the notification from the data processing unit 102 at SEQ12, the MAC unit 103 recognizes the LPI state, and stops a clock for a section predetermined to be unnecessary in the standby state in the MAC unit 103.

With reference to a sequence diagram of FIG. 5 and a flowchart of FIG. 6, processing, conforming to IEEE 802.3az, performed when the non-LPI state is detected in the LPI state will now be described in greater detail. Prior to the processing, the PHY unit 12 monitors traffic from the network 10 to the communication interface 1. At Step S110 in FIG. 6, if the PHY unit 12 determines that the traffic is generated in the LPI state (SEQ15 in FIG. 5), the PHY unit 12 detects the non-LPI state. The PHY unit 12 combines values of the received data signal, the data valid signal, and the data error signal into a combination indicating the non-LPI state, and transmits the signals to the data processing unit 102, thereby notifying the data processing unit 102 of the non-LPI state (SEQ16).

Subsequently, at Step S111, the data processing unit 102 decodes the received data signal, the data valid signal, and the data error signal received from the PHY unit 12, and recognizes that the device is in the non-LPI state. If the data processing unit 102 recognizes the non-LPI state, the data processing unit 102 notifies the MAC unit 103 (SEQ17) thereof. At Step S112, based on the notification from the data processing unit 102 at SEQ17, the MAC unit 103 recognizes the non-LPI state, and resumes the supply of the clock having been stopped when the LPI state has been detected.

An Embodiment

An embodiment will now be described. In the present embodiment, if a certain period of time has passed without any traffic, then, before the LPI state is detected, the link rate is changed to a lower link rate. If the LPI state is detected after the link rate has been changed, the device is shifted to the standby state, and supply of power and a clock is stopped. Because the link rate is changed before the detection of the LPI state, and the device is shifted to the standby state at the link rate thus changed, it is possible to reduce power consumption more effectively.

Figure 7:
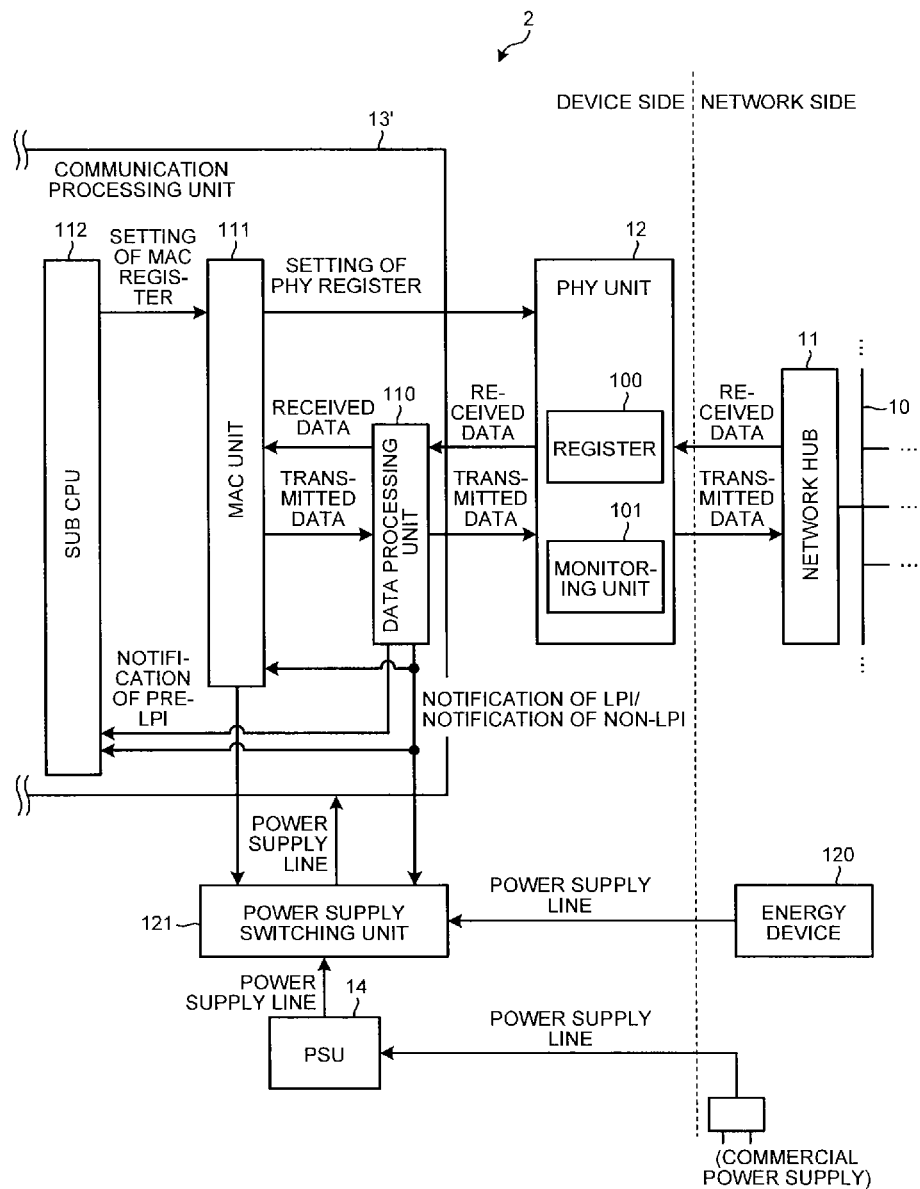
FIG. 7 is a block diagram of an exemplary configuration of a communication interface that is applicable to an embodiment.

FIG. 7 illustrates an exemplary configuration of a communication interface 2 that is applicable to the present embodiment. In FIG. 7, components similar to those in FIG. 1 are represented by similar reference numerals, and the detailed explanation thereof will be omitted.

In the configuration illustrated in FIG. 7, the configuration on the network side (the network 10 and the network hub 11) and the configuration of the PHY unit 12 are the same as those in FIG. 1. By contrast, on the device side, functions of a data processing unit 110, a MAC unit 111, and a sub CPU 112 included in a communication processing unit 13' are changed from those of the data processing unit 102, the MAC unit 103, and the sub CPU 104 illustrated in FIG. 1 (which will be described later in detail). Furthermore, in the present embodiment, the device side includes a power supply switching unit 121, and can switch a power supply source between the PSU 14 (commercial power supply) and an energy device 120 depending on the non-LPI state and the LPI state.

The energy device 120 is a device capable of supplying power without using the commercial power supply, and is a solar cell, for example. When the operation of the device shifts to the normal state, the power supply switching unit 121 switches a power supply line so as to select the PSU 14 as the power supply source. By contrast, if the device shifts to the LPI state, the power supply switching unit 121 switches the power supply line so as to select the energy device 120 as the power supply source.

Figure 8:
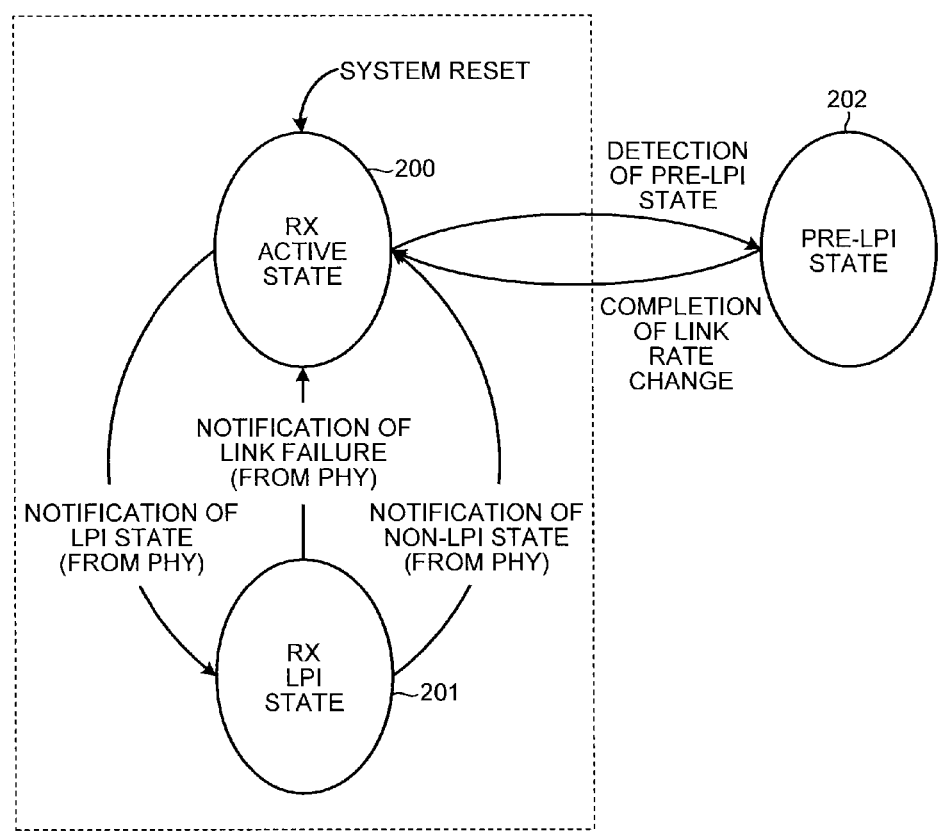
FIG. 8 is a state transition diagram of an exemplary state transition associated with notification of a state in a MAC unit according to the embodiment.

FIG. 8 is a state transition diagram of an exemplary state transition of the MAC unit 111 associated with notification of the LPI state or the non-LPI state according to the present embodiment. As illustrated in FIG. 8, in the present embodiment, a third state (pre-LPI state) 202 is added to the state transition diagram in FIG. 2. In the first state 200, if a pre-LPI state, which will be described later, is detected by the PHY unit 12, and is notified to the sub CPU 112, the state of the MAC unit 111 is shifted to the third state 202. In the third state 202, the MAC unit 111 performs processing for changing the link rate from a first link rate to a second link rate that is lower than the first link rate in response to an instruction from the sub CPU 112. When the change of the link rate to the second link rate is completed, the state of the MAC unit 111 is shifted from the third state 202 to the first state 200.

The pre-LPI state is a state in which no traffic is determined to be generated for a second period that is shorter than the certain period of time described above (hereinafter, referred to as a first period) for detecting the LPI state prescribed in the IEEE 802.3az. The second period is a time period that is at least shorter than the difference between the first period and time required to change the link rate from the first link rate to the second link rate.

Because the state transition between the first state 200 and the second state 201 is the same as that explained with reference to FIG. 2, the explanation thereof will be omitted.

Operations in the Embodiment

Operations according to the present embodiment will now be described. In the present embodiment, different operations are performed between the case where the link rate in the non-LPI state is the first link rate and the case where the link rate in the non-LPI state is the second link rate that is lower than the first link rate. The pre-LPI state is detected in the non-LPI state where the link rate is the first link rate.

The first link rate is 1 Gbps, and the second link rate is 100 Mbps, for example. However, the first link rate and the second link rate are not limited to 1 Gbps and 100 Mbps, respectively. The first link rate and the second link rate may be determined based on difference in power consumption in the communication interface 2 and power supply capacity of the energy device 120, for example.

Low Link Rate and Transition from the Non-LPI State to the LPI State

Figure 9:
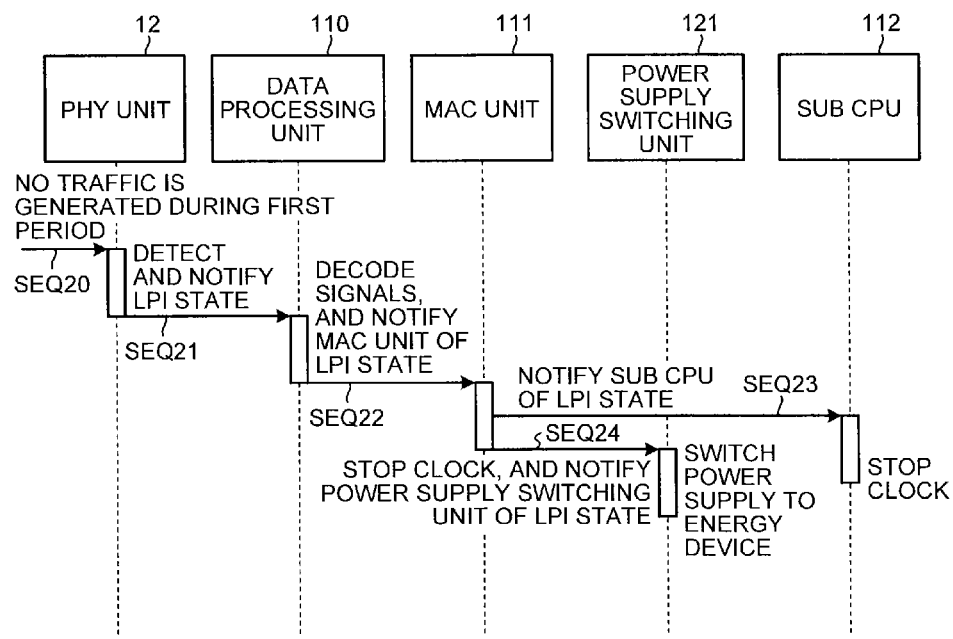
FIG. 9 is an exemplary sequence diagram of processing performed when the LPI state is detected at a low link rate according to the embodiment.

With reference to a sequence diagram of FIG. 9 and a flowchart of FIG. 10, processing performed when the LPI state is detected in the non-LPI state at the second link rate that is a low link rate will now be described in greater detail.

Figure 10:
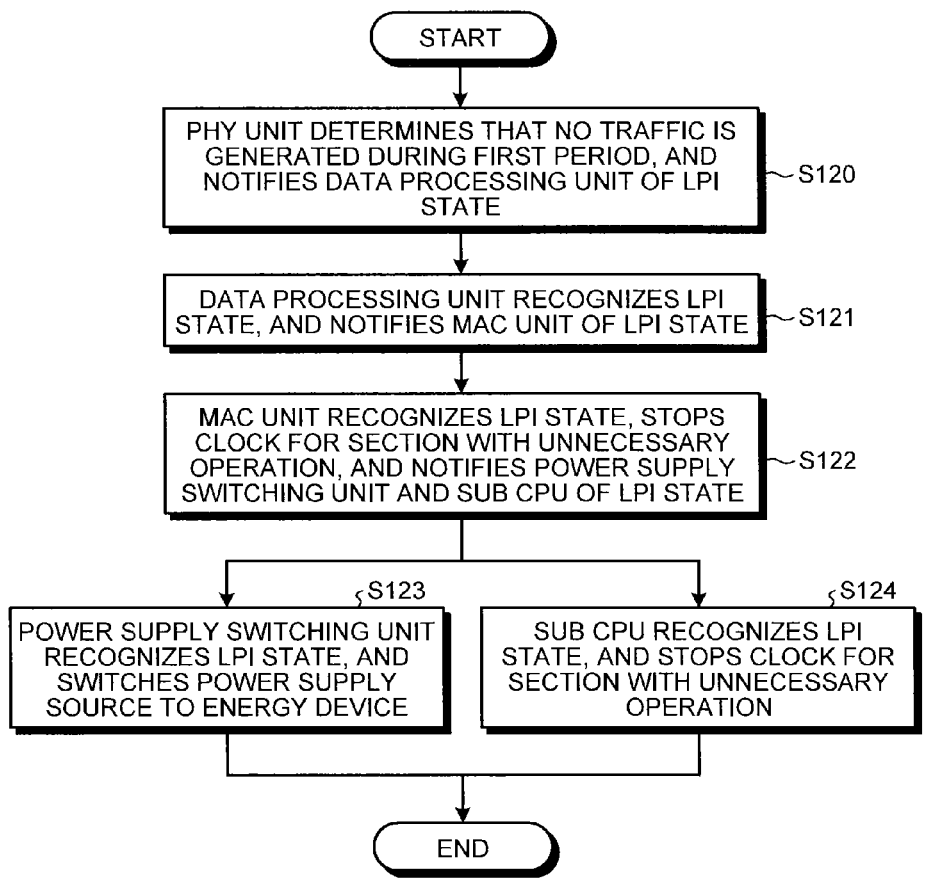
FIG. 10 is an exemplary flowchart of the processing performed when the LPI state is detected at a low link rate according to the embodiment.

At Step S120 in FIG. 10, if the PHY unit 12 determines that no traffic from the network 10 to the communication interface 2 is generated during the first period which is predetermined (SEQ20 in FIG. 9), the PHY unit 12 detects the LPI state. The PHY unit 12 transmits values of a received data signal, a data valid signal, and a data error signal to the data processing unit 110 as a combination indicating the LPI state, thereby notifying the data processing unit 110 of the LPI state (SEQ21).

Subsequently, at Step S121, the data processing unit 110 decodes the received data signal, the data valid signal, and the data error signal received from the PHY unit 12, and recognizes that the device is in the LPI state. If the data processing unit 110 recognizes that the device is in the LPI state, the data processing unit 110 notifies the MAC unit 111 thereof (SEQ22). At Step S122, based on the notification from the data processing unit 110 at SEQ22, the MAC unit 111 recognizes the LPI state, and stops a clock for a section predetermined to be unnecessary in the standby state. At the same time, the MAC unit 111 notifies the sub CPU 112 of the LPI state (SEQ23), and notifies the power supply switching unit 121 of the LPI state (SEQ24).

After the processing at Step S122, the process goes to Step S123 and Step S124. Processing at Step S123 and processing at Step S124 may be performed in parallel, or may be performed in a serial manner.

At Step S123, the power supply switching unit 121 recognizes the LPI state based on the notification from the MAC unit 111, selects the energy device 120 as the power supply source, and switches the power supply line from the PSU 14 to the energy device 120.

At Step S124, the sub CPU 112 recognizes the LPI state based on the notification from the MAC unit 111, and stops a clock for a section predetermined to be unnecessary in the standby state in the sub CPU 112. As a result, the operation of the sub CPU 112 is suppressed, whereby reduction in power consumption is achieved.

Low Link Rate and Transition from the LPI State to the Non-LPI State

Figure 11:
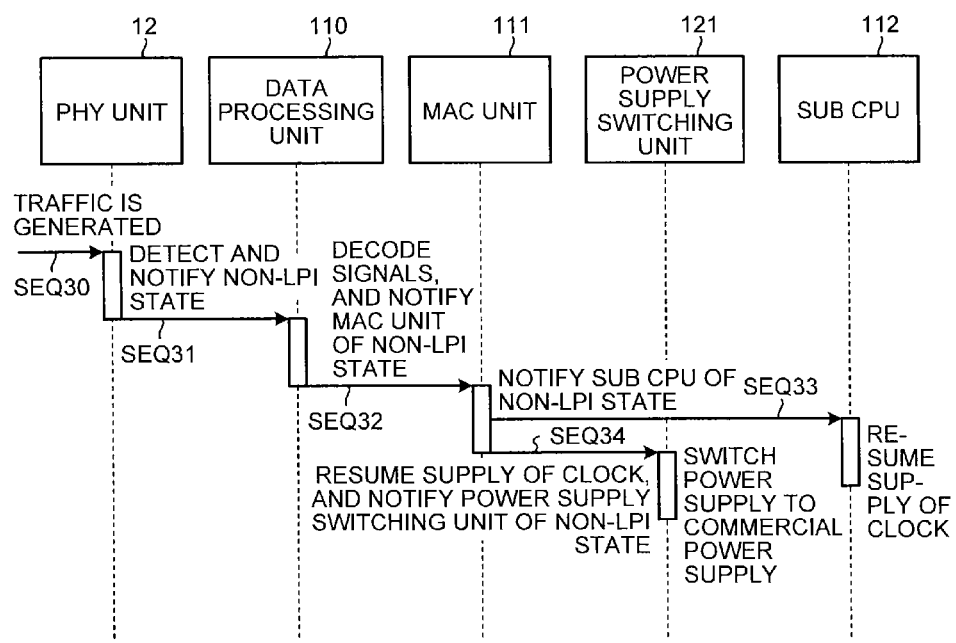
FIG. 11 is an exemplary sequence diagram of processing performed when the non-LPI state is detected at a low link rate according to the embodiment.

With reference to a sequence diagram of FIG. 11 and a flowchart of FIG. 12, processing performed when the non-LPI state is detected in the LPI state at the second link rate that is a low link rate will now be described in greater detail.

Figure 12:
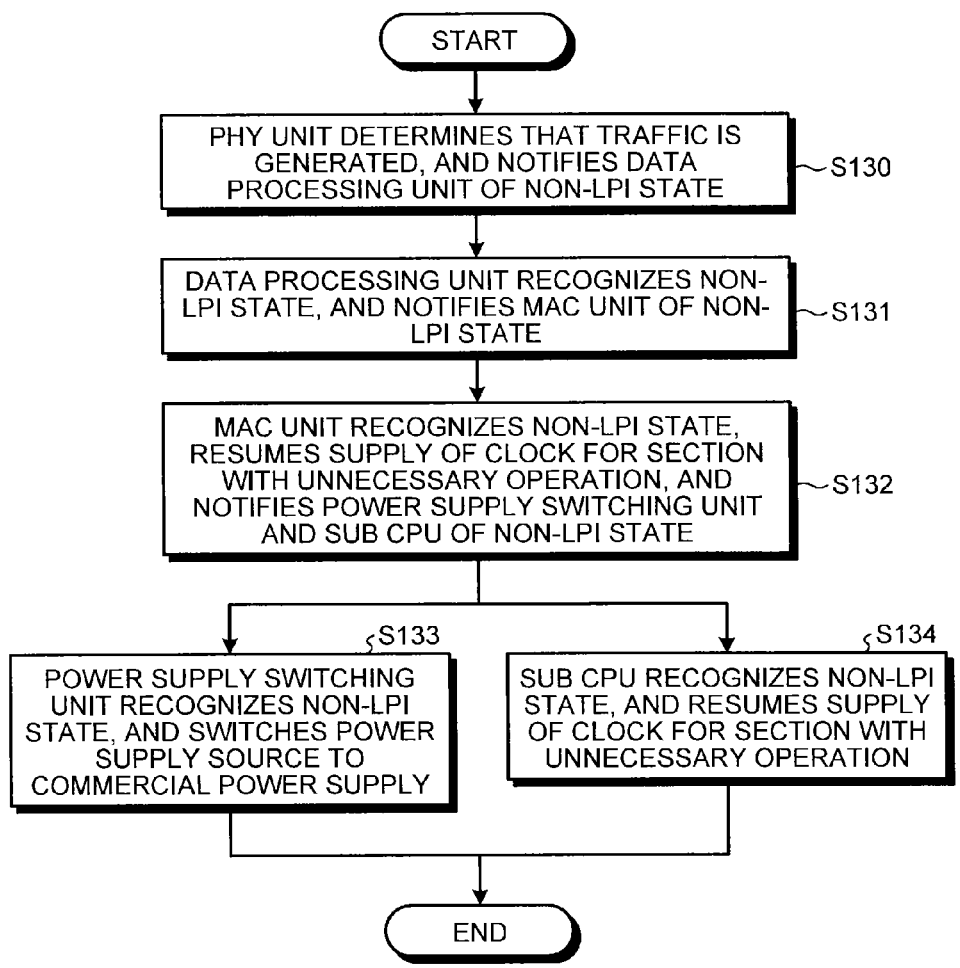
FIG. 12 is an exemplary flowchart of the processing performed when the non-LPI state is detected at a low link rate according to the embodiment.

At Step S130 in FIG. 12, when the PHY unit 12 determines that the traffic from the network 10 to the communication interface 2 is generated (SEQ30 in FIG. 11), the PHY unit 12 detects the non-LPI state. The PHY unit 12 transmits values of the received data signal, the data valid signal, and the data error signal to the data processing unit 110 as a combination indicating the non-LPI state, thereby notifying the data processing unit 110 of the non-LPI state (SEQ31).

Subsequently, at Step S131, the data processing unit 110 decodes the received data signal, the data valid signal, and the data error signal received from the PHY unit 12, and recognizes that the device is in the non-LPI state. If the data processing unit 110 recognizes the non-LPI state, the data processing unit 110 notifies the MAC unit 111 thereof (SEQ32). At Step S132, based on the notification from the data processing unit 110 at SEQ32, the MAC unit 111 recognizes the non-LPI state, and resumes the supply of the clock which has been stopped when the LPI state has been detected. At the same time, the MAC unit 111 notifies the sub CPU 112 of the non-LPI state (SEQ33), and notifies the power supply switching unit 121 of the non-LPI state (SEQ34).

After the processing at Step S132, the process goes to each of Step S133 and Step S134. Processing at Step S133 and processing at Step S134 may be performed in parallel, or may be performed in a serial manner.

At Step S133, the power supply switching unit 121 recognizes the non-LPI state based on the notification from the MAC unit 111, selects the PSU 14 as the power supply source, and switches the power supply line from the energy device 120 to the PSU 14. At Step S134, the sub CPU 112 recognizes the non-LPI state based on the notification from the MAC unit 111, and resumes the supply of the clock to a section which has been stopped when the LPI state has been detected.

High Link Rate and Transition from the Non-LPI State to the LPI State

Figure 13:
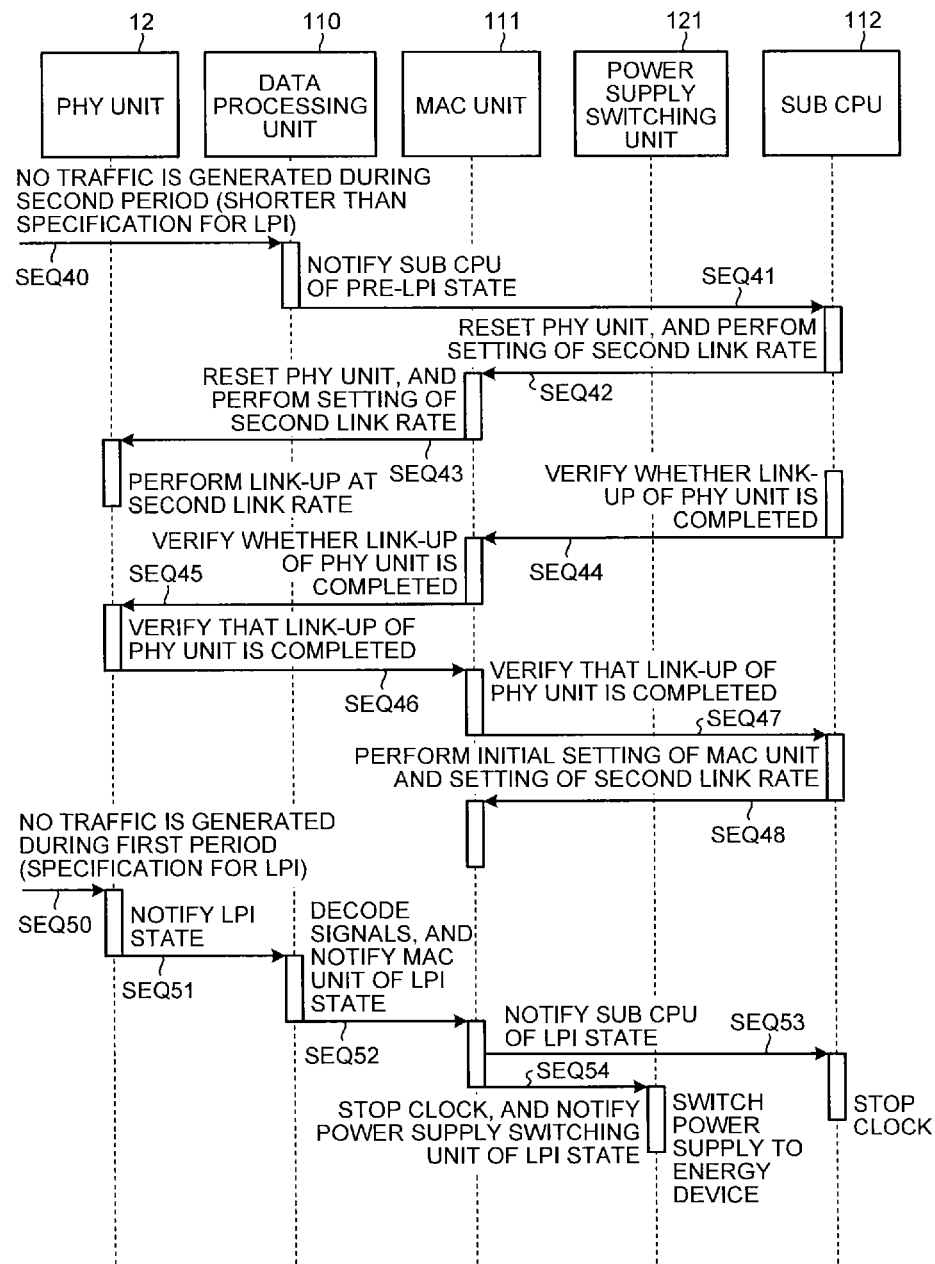
FIG. 13 is an exemplary sequence diagram of processing performed when the LPI state is detected at a high link rate according to the embodiment.

With reference to a sequence diagram of FIG. 13 and a flowchart of FIG. 14, processing performed when the LPI state is detected in the non-LPI state at the first link rate that is a high link rate will now be described in greater detail.

Figure 14:
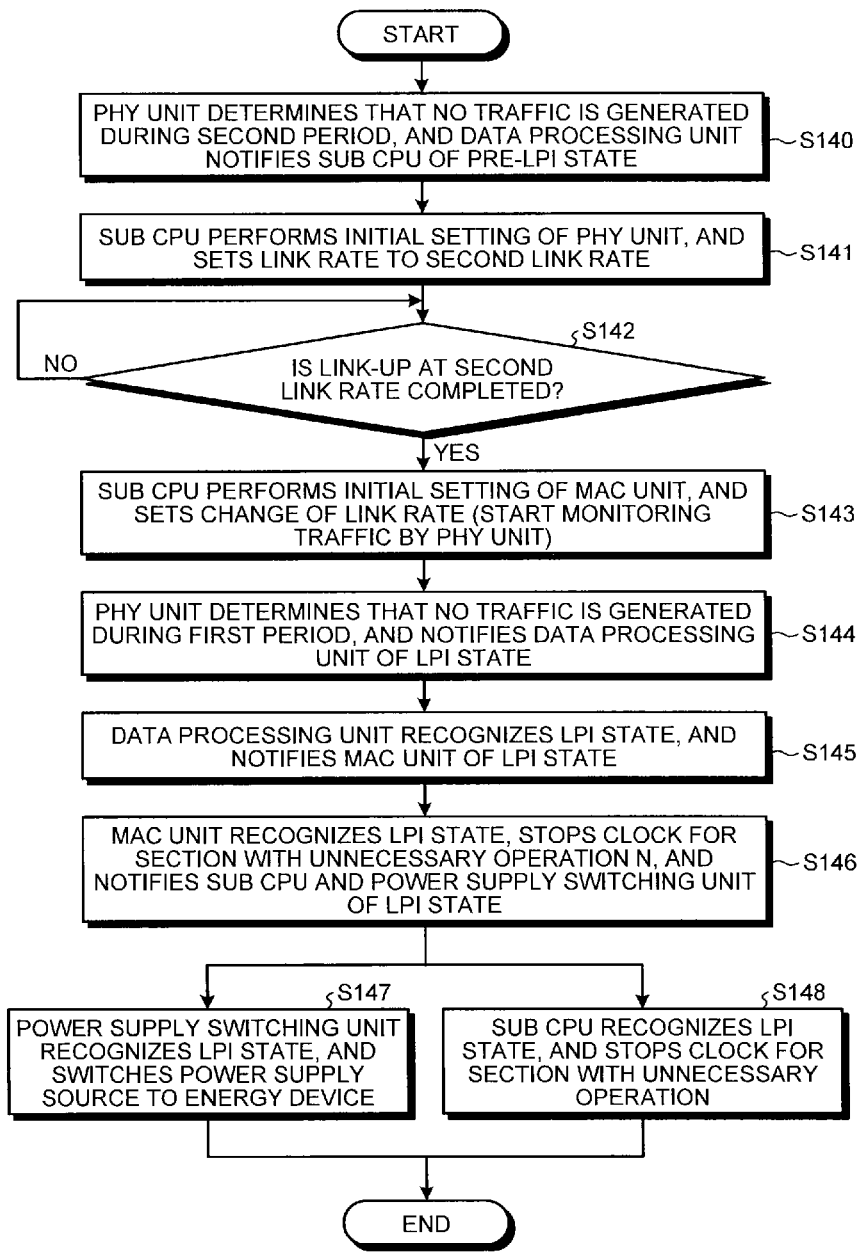
FIG. 14 is an exemplary flowchart of the processing performed when the LPI state is detected at a high link rate according to the embodiment.

At Step S140 in FIG. 14, if it is notified from the PHY unit 12 that no traffic from the network 10 to the communication interface 2 has been generated during the second period (SEQ40 in FIG. 13), the data processing unit 110 detects the pre-LPI state. If the data processing unit 110 detects the pre-LPI state, the data processing unit 110 notifies the sub CPU 112 the detection result (SEQ41). The state of the MAC unit 111 is changed from the first state 200 to the third state 202.

At Step S141, when the sub CPU 112 receives the notification indicating the pre-LPI state, the sub CPU 112 performs initial setting on the PHY unit 12, and sets the link rate to the second link rate. More specifically, the sub CPU 112 writes a value indicating that the initial setting (reset processing) of the PHY unit 12 is to be performed and a value indicating that the link rate is to be set to the second link rate to a register of the MAC unit 111 (SEQ42). The MAC unit 111 then reads the values from the register, and writes a value indicating that the initial setting is to be performed and a value indicating that the link rate is to be set to the second link rate to the register 100 of the PHY unit 12 in accordance with the values thus read (SEQ43). In accordance with the values written to the register 100, the PHY unit 12 performs the initial setting (reset processing). The PHY unit 12 then conducts negotiation with the network hub 11, and performs a link-up at the second link rate.

Subsequently, at Step S142, the sub CPU 112 determines whether the link-up at the second link rate is completed. More specifically, after issuing the instructions for the initial setting of the PHY unit 12 and the change of the link rate to the MAC unit 111 at SEQ42, the sub CPU 112 waits for a predetermined time period. After the time period elapses, the sub CPU 112 writes a value for instructing the PHY unit 12 to verify whether the link-up at the second link rate is completed to the register 100 of the PHY unit 12 via register access of the MAC unit 111 (SEQ44 and SEQ45).

The PHY unit 12 then reads the value from the register 100, and verifies whether the link-up at the second link rate is completed. If the link-up at the second link rate is determined to be completed, the PHY unit 12 notifies the sub CPU 112 that the link-up is completed via the MAC unit 111 in accordance with the value thus read (SEQ46 and SEQ47). Then, the process goes to Step S143.

By contrast, if the sub CPU 112 determines that the link-up at the second link rate is not completed yet at Step S142, the sub CPU 112 performs the processing at Step S142 again. For example, if the link-up processing is not completed within a predetermined time period, the PHY unit 12 determines that time is up, and performs processing such as error notification (not illustrated) to the sub CPU 112. For example, the link-up may possibly fail to be performed because of failure in the network hub 11.

If the completion of the link-up is notified from the MAC unit 111 at SEQ46 and SEQ47, the sub CPU 112 performs initial setting of the MAC unit 111, and sets the change of the link rate to the second link rate in the MAC unit 111 by the register access in the MAC unit 111 at Step S143 (SEQ48). Furthermore, after the completion of the link-up, the PHY unit 12 resumes monitoring the traffic.

Subsequently, at Step S144, if the PHY unit 12 determines that the state in which no traffic from the network 10 to the communication interface 2 is generated continues during the first period which is predetermined (SEQ50), the PHY unit 12 detects the LPI state. In this case, the first period is a time period from the beginning of the second period in which no traffic is determined to be generated at SEQ40.

Figure 15:
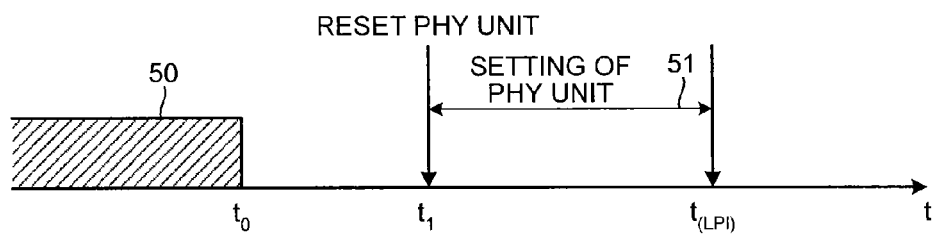
FIG. 15 is a schematic diagram for explaining a relationship between a first period and a second period.

With reference to FIG. 15, the relationship between the first period and the second period will now be described. Suppose that traffic 50 is interrupted at time $t_0$. A time period in which no traffic is generated is measured from the time $t_0$, and if the state in which no traffic is generated continues to predetermined time the sequence of SEQ40 and SEQ41 is performed, and the pre-LPI state is detected. At this time, the period of time from the time $t_0$ to the time $t_1$ is defined as the second period.

Subsequently, a time period in which no traffic is generated is further measured from the time $t_1$. If the state in which no traffic is generated still continues when time $t_{(LPI)}$ specified as the LPI state has passed since the time $t_0$ at which the traffic has been interrupted, the LPI state is detected. In other words, the period of time from the time $t_0$ to the time $t_{(LPI)}$ is defined as the first period.

At the time $t_1$, the PHY unit 12 is reset, and the initial setting of the PHY unit 12 is performed. The processing from SEQ40 to SEQ48 needs to be completed during a period of time 51 from the time $t_1$ to the time $t_{(LPI)}$. Therefore, the time $t_1$ indicating the end of the second period is set by expecting additional time required to perform the processing from SEQ40 to SEQ48 and considering the additional time and the time $t_{(LPI)}$. Furthermore, by setting the time period from the time $t_1$ to the time $t_{(LPI)}$ as short as possible, it is possible to prevent latency time caused by link cutting from being extended.

Referring back to FIG. 13 and FIG. 14, at Step S144 in FIG. 14, after detecting the LPI state at SEQ50 in FIG. 13, the PHY unit 12 combines values of the received data signal, the data valid signal, and the data error signal into a combination indicating the LPI state. The PHY unit 12 then transmits the signals to the data processing unit 110, thereby notifying the data processing unit 110 of the LPI state (SEQ51).

Subsequently, at Step S145, the data processing unit 110 decodes the received data signal, the data valid signal, and the data error signal received from the PHY unit 12, and recognizes that the device is in the LPI state. If the data processing unit 110 recognizes the LPI state, the data processing unit 110 notifies the MAC unit 111 of the LPI state (SEQ52). At Step S146, based on the notification from the data processing unit 110 at SEQ52, the MAC unit 111 recognizes the LPI state, and stops a clock for a section predetermined to be unnecessary in the standby state in the MAC unit 111. At the same time, the MAC unit 111 notifies the sub CPU 112 of the LPI state (SEQ53), and notifies the power supply switching unit 121 of the LPI state (SEQ54).

After the processing at Step S146, the process goes to Step S147 and Step S148. Processing at Step S147 and processing at Step S148 may be performed in parallel, or may be performed in a serial manner.

At Step S147, the power supply switching unit 121 recognizes the LPI state based on the notification from the MAC unit 111, selects the energy device 120 as the power supply source, and switches the power supply line from the PSU 14 to the energy device 120.

At Step S148, the sub CPU 112 recognizes the LPI state based on the notification from the MAC unit 111, and stops a clock for a section in which operation is predetermined to be unnecessary in the standby state in the sub CPU 112. As a result, the operation of the sub CPU 112 is suppressed, whereby reduction in the power consumption is achieved.

The explanation has been made of an example in which no traffic is generated within the first period, and the clock and the supply of power are stopped after the LPI state is detected. However, the embodiment is not limited to this example. For example, before the detection of the LPI state, clocks for sections predetermined to be unnecessary in the PHY unit 12, the MAC unit 111, and the sub CPU 112 can be stopped when the initial setting of the MAC unit 111 and the setting of the link rate are completed at SEQ48 in FIG. 13. With this configuration, it is possible to further reduce the power consumption.

High Link Rate and Transition from the LPI State to the Non-LPI State

Figure 16:
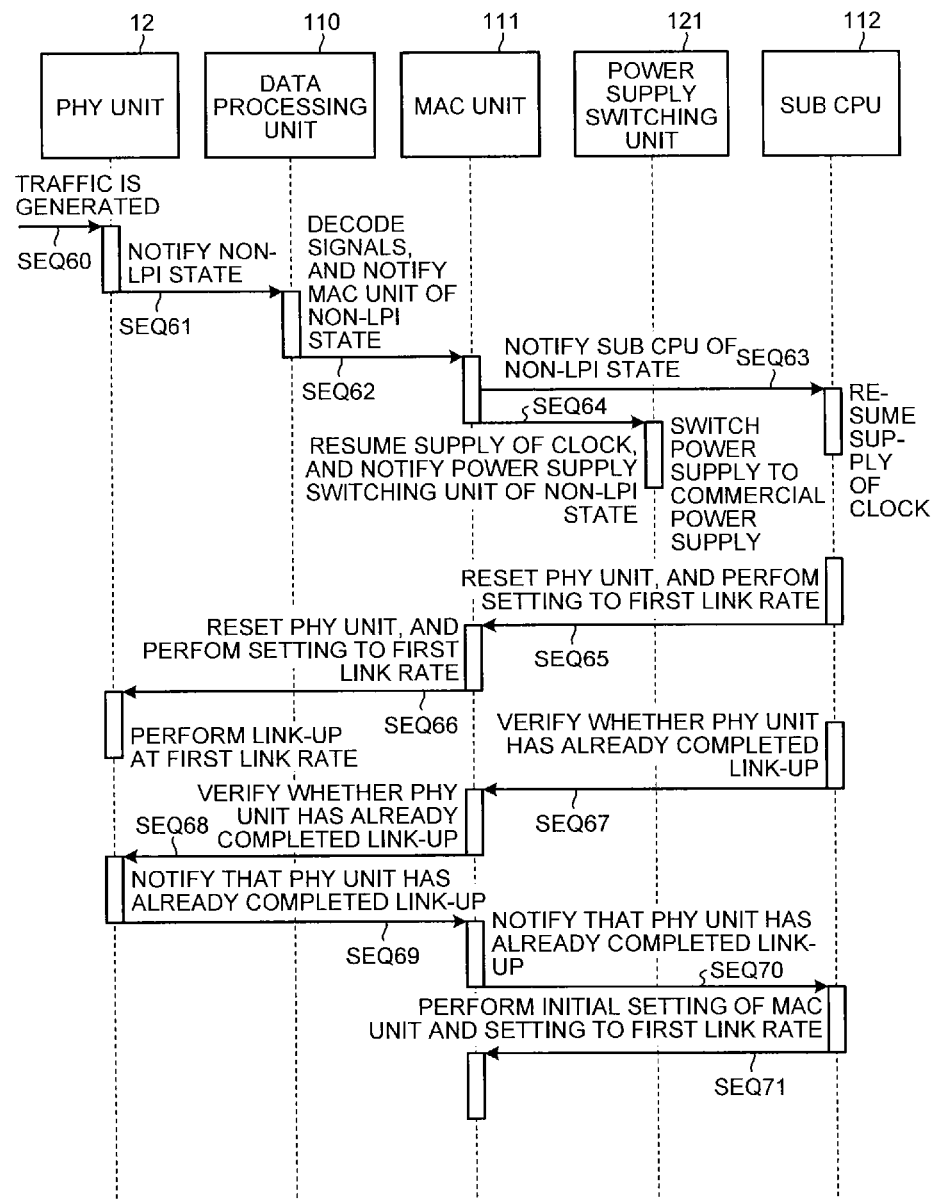
FIG. 16 is an exemplary sequence diagram of processing performed when the non-LPI state is detected at a high link rate according to the embodiment.

With reference to a sequence diagram of FIG. 16 and a flowchart of FIG. 17, processing performed when the non-LPI state is detected in the LPI state will now be described in detail. In the description below, it is assumed that the link rate is set to the second link rate at a low rate in the LPI state, and also that, when the non-LPI state is detected, the link rate is changed to the first link rate at a high rate.

At Step S150 in FIG. 17, if the PHY unit 12 determines that the traffic from the network 10 to the communication interface 2 is generated (SEQ60 in FIG. 16), the PHY unit 12 detects the non-LPI state. The PHY unit 12 combines values of the received data signal, the data valid signal, and the data error signal into a combination indicating the non-LPI state, and transmits the signals to the data processing unit 110, thereby notifying the data processing unit 110 of the non-LPI state (SEQ61).

At this stage, transfer of data from the network hub 11 to the PHY unit 12 is suspended. In other words, the PHY unit 12 and the network hub 11 perform handshaking continuously. As a result, if a preparation for communications is not completed yet in the PHY unit 12, and in the data processing unit 110, the MAC unit 111, and the like at subsequent stages, it is possible not to permit transfer of data from the network hub 11 to the PHY unit 12. Examples of the state in which the preparation for communications is not completed yet include a state in which setting of the registers of the PHY unit 12 and the MAC unit 111 are being performed and a state in which the link-up processing is being performed in the PHY unit 12.

Subsequently, at Step S151, the data processing unit 110 decodes the received data signal, the data valid signal, and the data error signal received from the PHY unit 12, and recognizes that the device is in the non-LPI state. If the data processing unit 110 recognizes the non-LPI state, the data processing unit 110 notifies the MAC unit 111 of the non-LPI state (SEQ62). At Step S152, based on the notification from the data processing unit 110 at SEQ62, the MAC unit 111 recognizes the non-LPI state, and resumes the supply of the clock stopped when the LPI state has been detected. At the same time, the MAC unit 111 notifies the sub CPU 112 of the non-LPI state (SEQ63), and notifies the power supply switching unit 121 of the non-LPI state (SEQ64).

After the processing at Step S152, the process goes to Step S153 and Step S154. Processing at Step S153 and processing at Step S154 may be performed in parallel, or may be performed in a serial manner.

At Step S153, the power supply switching unit 121 recognizes the non-LPI state based on the notification from the MAC unit 111, selects the PSU 14 as the power supply source, and switches the power supply line from the energy device 120 to the PSU 14. At Step S154, the sub CPU 112 recognizes the non-LPI state based on the notification from the MAC unit 111, and resumes the supply of the clock stopped when the LPI state has been detected.

After the processing at Step S153 and the processing at Step S154 are completed, the process goes to Step S155. By processing at Step S155 and processing subsequent thereto, the link rate is changed from the second link rate to the first link rate at a high rate. In other words, at Step S155, the sub CPU 112 performs the initial setting of the PHY unit 12 and setting of the link rate to the first link rate by the register access.

More specifically, the sub CPU 112 writes a value indicating that the initial setting (reset processing) of the PHY unit 12 is to be performed and a value indicating that the link rate is to be set to the first link rate to the register of the MAC unit 111 (SEQ65). The MAC unit 111 then reads the values from the register, and writes a value indicating that the initial setting is to be performed and a value indicating that the link rate is to be set to the first link rate to the register 100 of the PHY unit 12 in accordance with the values thus read (SEQ66). In accordance with the values written to the register 100, the PHY unit 12 performs the initial setting (reset processing). The PHY unit 12 then conducts negotiation with the network hub 11, and performs a link-up at the first link rate.

Subsequently, at Step S156, the sub CPU 112 determines whether the link-up at the first link rate is completed. More specifically, after issuing the instructions for the initial setting of the PHY unit 12 and the change of the link rate to the MAC unit 111 at SEQ65, the sub CPU 112 waits for a predetermined time period. After the time period elapses, the sub CPU 112 writes a value for instructing the PHY unit 12 to verify whether the link-up at the first link rate is completed to the register 100 of the PHY unit 12 via register access of the MAC unit 111 (SEQ67 and SEQ68).

The PHY unit 12 then reads the value from the register 100, and verifies whether the link-up at the first link rate is completed. If the link-up at the first link rate is verified to be completed, the PHY unit 12 notifies the sub CPU 112, via the MAC unit 111, that the link-up is completed in accordance with the value thus read (SEQ69 and SEQ70). Subsequently, the process goes to Step S157.

By contrast, if the sub CPU 112 determines that the link-up at the first link rate is not completed yet at Step S156, the sub CPU 112 performs the processing at Step S156 again. If the link-up processing is not completed within a predetermined time period, for example, the PHY unit 12 determines that time is up, and performs processing such as error notification (not illustrated) to the sub CPU 112.

If the completion of the link-up is notified from the MAC unit 111 at SEQ69 and SEQ70, the sub CPU 112, at Step S157, performs the initial setting of the MAC unit 111, and sets the change of the link rate to the first link rate in the MAC unit 111 by the register access in the MAC unit 111 (SEQ71). Furthermore, after the completion of the link-up, the PHY unit 12 resumes monitoring the traffic.

After the initial setting of the MAC unit 111 and the change of the link rate are completed, the PHY unit 12 can receive data from the network hub 11. After the initial setting and the change of the link rate are completed, the MAC unit 111 writes a value indicating that the PHY unit 12 can receive data to the register 100 of the PHY unit 12, and notifies the PHY unit 12 at Step S158 that the PHY unit 12 can receive data.

In response to the notification that the PHY unit 12 can receive data received from the MAC unit 111, the PHY unit 12 notifies the network hub 11 at Step S159 that the PHY unit 12 can receive data. Subsequently, in response to the notification that the PHY unit 12 can receive data received from the PHY unit 12, the network hub 11 starts to transfer data transmitted from the network 10 to the communication interface 2 at Step S160.

The explanation has been made of an example in which the clocks for the sections whose operations are predetermined to be unnecessary in the standby mode are stopped in the MAC unit 111 and the sub CPU 112 in the LPI state. However, the present embodiment is not limited thereto. For example, the supply of power to the sections may be stopped, or both the clock and the supply of power may be stopped. Furthermore, the clock is not necessarily stopped. Alternatively, the frequency of the clock may be decreased compared with that in the non-LPI state, for example.

As described above, according to the present embodiment, if no traffic is generated for the certain period of time, the LPI state is detected. In the LPI state, if change of the link rate is not permitted, the pre-LPI state is detected before the detection of the LPI state. Subsequently, in the state where the pre-LPI state is detected, the link rate is changed. After the link rate is changed, the LPI state is detected.

As a result, in the state where the communication interface 2 is set at a link rate consuming a large amount of power, such as 1 Gbps, if no traffic is generated for the certain period of time, the link rate can be changed to a link rate consuming a smaller amount of power, such as 100 Mbps, in the pre-LPI state, and thereafter the LPI state can be detected. Therefore, it is possible to reduce power consumption more effectively in the LPI state.

According to the present embodiment, it is possible to make a network response enabled and to achieve further reduction in power consumption of a communication interface in a standby state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that has a normal state and a standby state such that power consumption is more suppressed in the standby state than in the normal state and that does not permit a change of a link rate in the standby state, the communication device comprising:
   a connecting unit that connects the communication device to a network;
   a detecting unit that detects traffic at the connecting unit in the network; and
   a control unit that performs
      transition processing from the normal state to the standby state when the detecting unit detects no traffic for a first period that has been predetermined while the communication device is in the normal state,
   wherein when the control unit is connected to the network by the connecting unit at a first link rate and the detecting unit detects no traffic for a second period that is shorter than the first period, the control unit
      performs transition processing from the normal state to a pre-standby state and changes the link rate to a second link rate that is lower than the first link rate, and
      performs transition processing from the pre-standby state to the normal state after the link rate has been changed from the first link rate to the second link rate.

2. The communication device according to claim 1, wherein the second period is a period of time that is shorter than a difference between the first period and a period of time required for the control unit to complete change of the link rate from the first link rate to the second link rate.

3. The communication device according to claim 1, wherein the control unit performs operation suppression processing on a function which has been predetermined to be unnecessary to perform operation in the standby state after the change of the link rate to the second link rate which is lower than the first link rate is completed in the second period and before the first period is terminated.

4. The communication device according to claim 3, wherein
   the control unit includes
      an access controller that controls access to the network, and
      a setting unit that performs setting of the link rate on the connecting unit and
   the access controller, and
   the control unit performs the operation suppression processing on at least the access controller and the setting unit as the predetermined function.

5. The communication device according to claim 1, wherein
   the control unit includes
      an access controller that controls access to the network, and
      a setting unit that performs setting of the link rate on the connecting unit and
   the access controller, and
   the control unit performs operation suppression processing on at least the access controller and the setting unit when the control unit performs transition from the normal state to the standby state.

6. The communication device according to claim 1, wherein the control unit performs transition processing from the standby state to the normal state when the detecting unit detects the traffic in the standby state, and changes the link rate from the second link rate to the first link rate after the control unit has performed transition to the normal state.

7. A communication method in which a normal state and a standby state are provided such that power consumption is more suppressed in the standby state than in the normal state and a change of a link rate in the standby state is not permitted, the communication method comprising:
   connecting, by a connecting unit, to a network;
   detecting, by a detecting unit, traffic in the connecting unit on the network;
   controlling, by a control unit, to perform transition processing from the normal state to the standby state when no traffic is detected at the detecting for a first period that has been predetermined in the normal state,
   wherein when a connection is made to the network at a first link rate by the connecting and no traffic is detected by the detecting for a second period which is shorter than the first period, the control unit performs
      transition processing from the normal state to a pre-standby state where the link rate is changed by the controlling to a second link rate that is lower than the first link rate, and
      performs transition processing from the pre-standby state to the normal state after the link rate has been changed from the first link rate to the second link rate.

8. A non-transitory computer-readable medium having computer-readable instructions thereon which when executed by a computer cause the computer to perform a communication method in which a normal state and a standby state are provided such that power consumption is more suppressed in the standby state than in the normal state and a change of a link rate in the standby state is not permitted, the communication method comprising:
   connecting, by a connecting unit, to a network;
   detecting, by a detecting unit, traffic in the connecting unit on the network;
   controlling, by a control unit, to perform transition processing from the normal state to the standby state when no traffic is detected at the detecting for a first period that has been predetermined in the normal state; and
   wherein when a connection is made to the network at a first link rate by the connecting and no traffic is detected by the detecting for a second period which is shorter than the first period, the control unit performs
      transition processing from the normal state to a pre-standby state where the link rate is changed by the controlling to a second link rate that is lower than the first link rate, and
      performs transition processing from the pre-standby state to the normal state after the link rate has been changed from the first link rate to the second link rate.

* * * * *